S. E. & M. P. JACKSON.
Mower.
No. 18,976.
Patented Dec. 29, 1857.
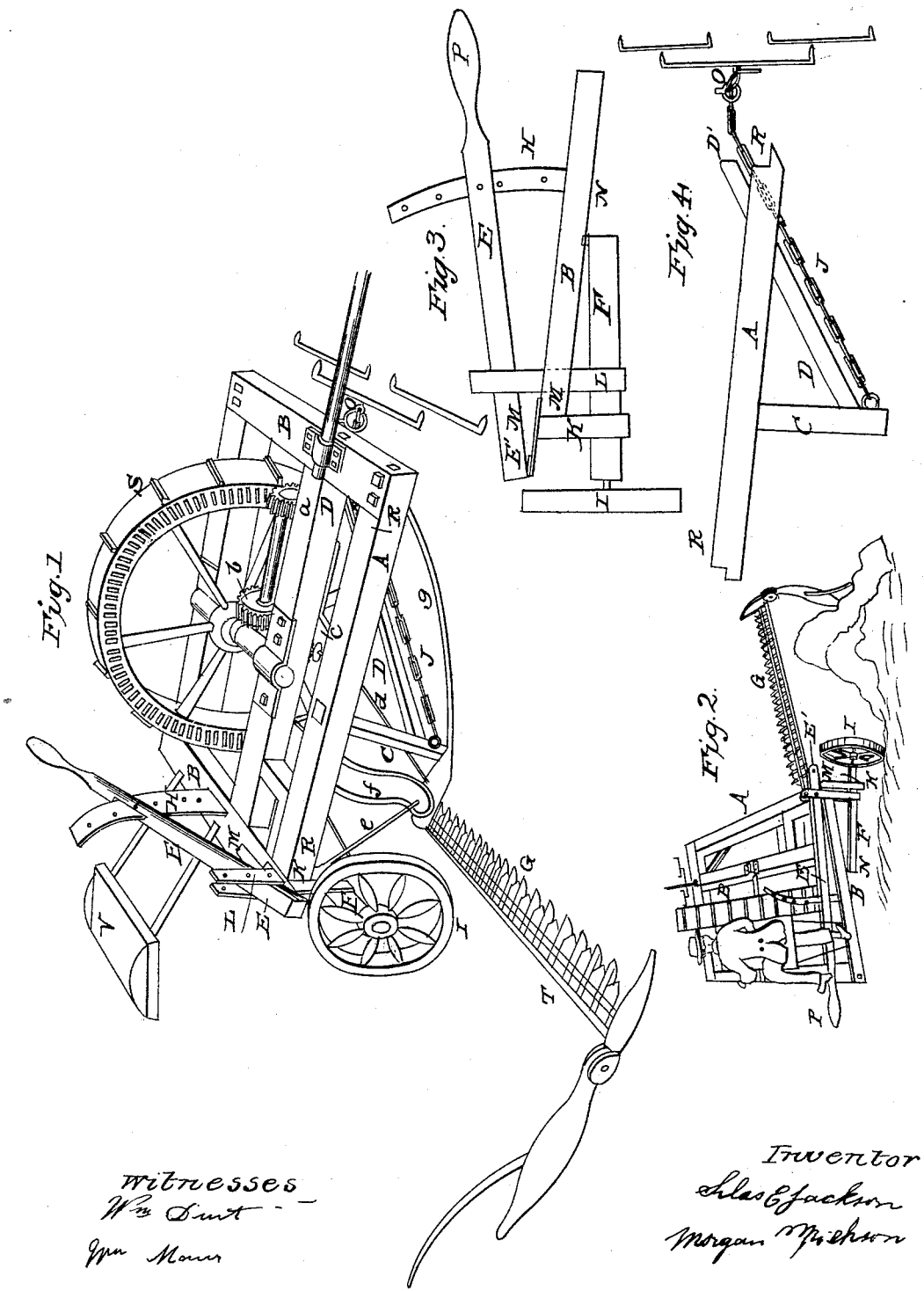

UNITED STATES PATENT OFFICE.

SILAS E. JACKSON AND MORGAN P. JACKSON, OF BOONVILLE, NEW YORK.

IMPROVEMENT IN MOWING-MACHINES.

Specification forming part of Letters Patent No. 18,976, dated December 29, 1857.

*To all whom it may concern:*

Be it known that we, SILAS E. JACKSON and MORGAN P. JACKSON, of Boonville, in the county of Oneida and State of New York, have invented certain new and useful Improvements in Harvesting - Machines; and we do hereby declare the following to be a full, clear, and exact description of the construction and operation thereof, reference being had to the accompanying drawings, making a part of this specification, in which—

Figure 1 represents a perspective view of the machine. Fig. 2 represents on a reduced scale a perspective view from the rear of the machine, with the cutter-bar raised up to pass over an obstacle in its path. Fig. 3 represents the raising apparatus detached. Fig. 4 represents the plan of connecting the drag-chain to the machine.

Similar letters of reference, where they occur in the several figures, denote like parts of the machine in all of them.

The nature of our invention consists in the special manner in which we have combined with harvesting - machines having but one main supporting-wheel, the finger-bar resting on the ground, and being supported by braces connected with it and the main frame, a raising and supporting wheel, and connected therewith a lever extending to the driver's seat, so that while said wheel is always a supporting-wheel to the frame of the machine it may also, when desired, be used for raising up said frame to allow the cutter-bar to pass over any interposing obstacle.

To enable others skilled in the art to make and use our invention, we will proceed to describe the same with reference to the drawings.

B represents a quadrangular frame, supported in the usual manner on the main driving and supporting wheel S. Motion is communicated to the cutters from the wheel S through the pinions *a b c*, which operate a horizontal crank that is connected to the cutter-bar by the rod *d*, and thus give it its reciprocating motion. The finger-bar T is connected and braced to the main frame B by the braces *e f g*.

The driver's seat U is located at the rear left-hand corner of the frame B, which is the rear corner most remote from the standing grain; and underneath the rear cross-beam of the frame, to which the seat is attached, is hinged, as at N, an axle, F, which has upon its loose end a supporting and raising wheel, I. The axle F lies parallel with and underneath the rear cross-piece of the frame B.

K is a guide-piece, suspended to the frame B, to keep the axle F in proper vertical position when the frame is raised up upon it, as shown in Fig. 2.

A lever, E, is hinged at the point E' to a bar, M, that is secured to the frame B, and this lever extends across the machine, so as to be easily caught and operated by the driver in his seat. The lever E is connected to the hinged axle F by stirrups L, so that by operating said lever the frame B (particularly at the corner M') may be readily raised or lowered, which raises and lowers the cutter-bar.

H is a bent bar or arc, passing through a slot in the lever E, so that by means of a pin passing through the lever and one of the series of holes in the arc H the cutters may be held at any proper position in relation to the grass or grain to be cut by it. The wheel I also facilitates the turning around of the machine, as a large proportion of the weight of the machine may be thrown upon it, and in so doing it is brought considerably under the frame and in proper position for the turning, which is always made from right to left.

The lever E is hinged at one end of the rear cross-piece of the frame B and above it, and is in the same vertical plane with it. The axle F is hinged near the other end of said rear cross-piece and underneath, but also in the same vertical plain with the lever E and frame-piece B, so that a compound-lever motion is had, as the lever F becomes a lever as well as the lever E is, one receding from the frame as the other approaches it, and vice versa.

A is an auxiliary frame, and C D braces connected to it.

J is a drag-chain passing obliquely and upward from the lower end of the brace C to and passing through a ring, O, and independent entirely of the tongue V, the whiffletrees being connected immediately to the chain J, and not to the frame or tongue; but as this portion of the machine constitutes the subject-matter of another application for Letters Patent, further description of it here would be superfluous.

Having thus fully described the nature and object of our invention, we would state that we do not claim a raising wheel and lever as generally applied to harvesting-machines; but What we do claim as new, and desire to secure by Letters Patent, is—

The combination, in harvesting-machines having but one main supporting-wheel, the finger-bar resting on the ground and supported by braces connected with it and the main frame of the machine, of the hinged lever E and hinged axle F, with its wheel I, when arranged and located in relation to the rear cross-piece of the frame and the driver's seat substantially as described.

SILAS E. JACKSON.
MORGAN P. JACKSON.

Witnesses:
A. B. STOUGHTON,
THOS. H. UPPERMAN.